(12) United States Patent
Huang et al.

(10) Patent No.: US 9,462,460 B2
(45) Date of Patent: *Oct. 4, 2016

(54) VIRTUAL ACCESS POINT USING SINGLE SERVICE SET IDENTIFIERS

(71) Applicant: Telefonaktiebolaget L M Ericsson (publ), Stockholm (SE)

(72) Inventors: Kaiyuan Huang, Kanata (CA); Stephen G. Rayment, Ottawa (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/552,962

(22) Filed: Nov. 25, 2014

(65) Prior Publication Data

US 2015/0078365 A1 Mar. 19, 2015

Related U.S. Application Data

(63) Continuation of application No. 13/592,141, filed on Aug. 22, 2012, now Pat. No. 8,897,197.

(60) Provisional application No. 61/526,071, filed on Aug. 22, 2011.

(51) Int. Cl.
| | | |
|---|---|---|
| *H04W 8/26* | (2009.01) | |
| *H04W 48/12* | (2009.01) | |
| *H04W 48/14* | (2009.01) | |
| *H04W 84/12* | (2009.01) | |

(52) U.S. Cl.
CPC ............. *H04W 8/26* (2013.01); *H04W 48/12* (2013.01); *H04W 48/14* (2013.01); *H04W 84/12* (2013.01)

(58) Field of Classification Search
CPC .......................... H04W 72/005; H04L 12/189
USPC ........................................................ 370/312
See application file for complete search history.

(56) References Cited

U.S. PATENT DOCUMENTS

| | | |
|---|---|---|
| 7,000,012 B2 | 2/2006 | Moore et al. |
| 7,948,953 B2 | 5/2011 | Melkote et al. |
| 8,072,977 B2 | 12/2011 | Omar |

(Continued)

FOREIGN PATENT DOCUMENTS

WO 2009/032855 A1 3/2009

OTHER PUBLICATIONS

IEEE 802.11 u-2011, "Part II: Wireless medium Access Control (MAC) and Physical Layer (PHY) Specifications; Amendment 9: Interworking with External Networks", IEEE.org; Feb. 25, 2011.

(Continued)

*Primary Examiner* — Melvin Marcelo
*Assistant Examiner* — Peter Solinsky
(74) *Attorney, Agent, or Firm* — Katten Muchin Rosenman LLP (57) ABSTRACT

An Access Point ("AP") apparatus comprising one or more processors containing program code. The program code may be configured to: (i) cause the AP to broadcast a beacon containing a single SSID indentifying the AP; (ii) cause the AP to receive from the STA an query for network information for at least one network operator accessible through the AP; and (iii) cause the AP to send to the STA, for the at least one network operator, a network information description element, in response to the network information query. The AP providing the plural responses broadcasts only a single service set identification ("SSID").

32 Claims, 5 Drawing Sheets

(56) References Cited

U.S. PATENT DOCUMENTS

| | | | |
|---|---|---|---|
| 2002/0071427 A1* | 6/2002 | Schneider et al. | 370/352 |
| 2003/0061329 A1* | 3/2003 | McGrath | 709/223 |
| 2005/0079853 A1* | 4/2005 | Hurtta | 455/403 |
| 2005/0250487 A1* | 11/2005 | Miwa | H04W 88/021 455/422.1 |
| 2009/0137227 A1* | 5/2009 | Bencheikh | 455/411 |
| 2010/0275249 A1* | 10/2010 | McCann et al. | 726/5 |
| 2011/0040969 A1 | 2/2011 | Yao et al. | |
| 2011/0103266 A1 | 5/2011 | Andreasen et al. | |
| 2011/0299481 A1* | 12/2011 | Kim et al. | 370/329 |
| 2012/0026929 A1 | 2/2012 | Wang et al. | |
| 2012/0072976 A1 | 3/2012 | Patil et al. | |
| 2012/0076117 A1* | 3/2012 | Montemurro | H04W 48/16 370/338 |
| 2012/0282959 A1* | 11/2012 | Abraham et al. | 455/500 |
| 2013/0012260 A1* | 1/2013 | Salkintzis et al. | 455/550.1 |
| 2013/0208891 A1 | 8/2013 | Kholaif et al. | |
| 2014/0092779 A1* | 4/2014 | Seok et al. | 370/254 |
| 2014/0101726 A1* | 4/2014 | Gupta et al. | 726/4 |
| 2015/0146709 A1* | 5/2015 | Kim et al. | 370/338 |

OTHER PUBLICATIONS

"It's All About U", Ruckus Wireless Inc., 2011; [retrieved on Dec. 21, 2012]. Retrieved from Internet at <httQ://www. ruckuswireless.com/whitcQaQers.>.

"Wi-Fi Certified Passpoint Architecture for Public Access", Aruba Networks, 2011; [retrieved on Dec. 28, 2012]. Retrieved from Internet at <http://www.arubanetworks.com/pdf/technology/whitepapersWP_Passpoint_Wi-Fi. pdf>.

"Wi-Fi CERTIFIED Passpoint (release 1) Deployment Guidelines", Wi-Fi Alliance, Oct. 2012, [retrieved on Dec. 21, 2012]. Retrieved from Internet at <http://www.wi-fi.org/sites/default/files/201210 I 0_Passpoint_r1_DP.pdf>.

Transmittal; International Search Report; and the Written Opinion of the International Searching Authority for International Patent Application No. PCT/IB2012/002069, with a mailing date of Jan. 16, 2013.

IEEE P802.11u/D13.0, Nov. 2010.

IEEE Std 802.11-2007, Jun. 12, 2007.

Extended European Search Report for European Patent Application No. EP 12 82 5313 with a mailing date of May 12, 2015.

* cited by examiner

VIRTUAL ACCESS POINT USING SINGLE SERVICE SET IDENTIFIERS

CROSS-REFERENCE TO RELATED APPLICATIONS

The present application is a Continuation of U.S. patent application Ser. No. 13/592,141, filed Aug. 22, 2012, now U.S. Pat. No. 8,897,197, issued Nov. 25, 2014, which claims priority benefit of U.S. Patent Application No. 61/526,071, filed Aug. 22, 2011, the contents of the above-mentioned applications are incorporated herein by reference in their entirety.

TECHNICAL FIELD

The present invention relates to wireless communication. More specifically, the present invention relates to wireless local area network ("WLAN"), Wi-Fi, and pico-cellular wireless communications systems, including IEEE 802.11 systems.

BACKGROUND

Access Point ("AP") devices compliant with IEEE standard 802.11 (the entirety of which is incorporated herein by reference) provide the capability to "virtualize" access, thus enabling multiple operators to use the same Access Point ("AP"). Each operator is identified by having the AP broadcast a Service Set Identification ("SSID") specific to the operator in the 802.11 beacon. The user device station ("STA"—a wireless network client, a desktop computer, laptop, mobile device, cell phone, or PDA) can connect (associate) to a particular operator upon seeing the appropriate SSID. Based on the SSID selected, "treatment" specific to that operator, e.g., Virtual LAN ("VLAN"), Quality of Service ("QoS"), authentication server address, etc., can be applied. In addition, indications of the capabilities of each operator's network can be indicated after the association.

Alternatively, an AP may have only a single SSID and instead use a query-response protocol, such as Access Network Query Protocol ("ANQP")—a query and response protocol used by an STA (such as a mobile device) to discover a range of information, including the hotspot operator's domain name (a globally unique, machine searchable data element); roaming partners accessible via the hotspot along with their credential type and EAP method supported for authentication; Internet Protocol ("IP") address type availability (for example, IPv4, IPv6); and other metadata useful in a mobile device's network selection process, as specified in the IEEE standard P802.11u-2011, Amendment 9: Interworking with External Networks ("Amendment 9"), the entirety of which is incorporated herein by reference. This range of information can be provided by the AP in response to a query from the STA, prior to the STA associating to the AP.

When the AP broadcasts a single SSID there is currently no means to indicate to the STA via ANQP the capabilities supported by each operator network prior to association.

SUMMARY OF THE INVENTION

It is an object of the subject disclosure to overcome the disadvantages noted above and to provide apparatus and method for providing an STA with information regarding the capabilities of each operator network accessible through the AP identified by a single SSID.

According to a first aspect of the present invention, Access Point ("AP") apparatus comprises one or more processors containing program code configured to: cause the AP to broadcast a beacon containing a single SSID indentifying the AP; cause the AP to receive from an STA an Internet Protocol (IP) Address Type Availability Query for at least one network operator accessible through the AP; and cause the AP to send to the STA, for the at least one network operator, an IP address type availability information element, in response to the IP Address Type Availability Query.

According to a second aspect of the present invention, a mobile station ("STA") apparatus comprises one or more processors containing program code configured to: cause the STA to receive from an Access Point (AP) a beacon containing a single SSID indentifying the AP; cause the STA to send to the AP an Internet Protocol (IP) Address Type Availability Query for at least one network operator accessible through the AP; and cause the STA to receive from the AP, for the at least one network operator, an IP address type availability information element, in response to the IP Address Type Availability Query.

According to a third aspect of the present invention, a computer-implemented method for indicating network capabilities at an Access Point ("AP"), is comprised of the following steps: broadcasting a beacon containing a single SSID indentifying the AP; receiving from an STA an Internet Protocol (IP) Address Type Availability Query for at least one network operator accessible through the AP; and sending to the STA, for the at least one network operator, an IP address type availability information element, in response to the IP Address Type Availability Query.

According to a fourth aspect of the present invention, a computer-implemented method for indicating network capabilities at a receiving station ("STA"), is comprised of the following steps: receiving from an Access Point (AP) a beacon containing a single SSID indentifying the AP; sending to the AP an Internet Protocol (IP) Address Type Availability Query for at least one network operator accessible through the AP; and receiving from the AP, for the at least one network operator, an IP address type availability information element, in response to the IP Address Type Availability Query.

In certain aspects, the one or more processors may contain program code configured to cause the AP to receive from the STA, for at least one network operator, a Wide Area Network (WAN) Metrics Query; and cause the AP to send to the STA, for the at least one network operator, a WAN Metrics Information element, in response to the WAN Metrics Query.

In other aspects, the one or more processors may contain program code configured to: cause the AP to receive from the STA, for at least one network operator, a Connection Capability Query; and cause the AP to send to the STA, for the at least one network operator, a connection capability information element, in response to the Connection Capability Query.

In certain aspects, one or more processors contains program code configured to communicate with the STA using IEEE 802.11 Access Network Query Protocol ("ANQP"). The one or more processors may contain program code configured to cause the AP to send the single SSID on a IEEE 802.11 beacon.

In yet another aspect, one or more processors contains program code configured to cause the STA to associate with the AP, with respect to one of the plural network operators.

DESCRIPTION OF THE DRAWINGS

These and other advantages of the present invention will be readily understood with reference to the following specifications and attached drawings wherein.

DETAILED DESCRIPTION

Preferred embodiments of the present invention will be described herein below with reference to the accompanying drawings. In the following description, well-known functions or constructions are not described in detail because they may obscure the invention in unnecessary detail. The present invention relates to an innovative apparatus, system, and/or method that may be coupled to, or integrated with, an AP or other communication device to enhance Wi-Fi and pico-cellular operation with multiple clients. For this disclosure, the following terms and definitions shall apply:

The terms "IEEE 802.11" and "802.11" refer to a set of standards for implementing wireless local area network ("WLAN") computer communication in the 2.4, 3.6 and 5 GHz frequency bands and other bands as specified by the IEEE LAN/MAN Standards Committee ("IEEE 802").

The terms "communicate" and "communicating" as used herein include both conveying data from a source to a destination, and delivering data to a communications medium, system, channel, network, device, wire, cable, fiber, circuit and/or link to be conveyed to a destination; the term "communication" as used herein means data so conveyed or delivered. The term "communications" as used herein includes one or more of a communications medium, system, channel, network, device, wire, cable, fiber, circuit and/or link.

The term "processor" as used herein means processing devices, apparatus, programs, circuits, components, systems and subsystems, whether implemented in hardware, tangibly-embodied software or both, and whether or not programmable. The term "processor" as used herein includes, but is not limited to, one or more computers, hardwired circuits, signal modifying devices and systems, devices and machines for controlling systems, central processing units, programmable devices and systems, field programmable gate arrays, application-specific integrated circuits, systems on a chip, systems comprised of discrete elements and/or circuits, state machines, virtual machines, data processors, processing facilities and combinations of any of the foregoing.

The terms "storage" and "data storage" as used herein mean one or more data storage devices, apparatus, programs, circuits, components, systems, subsystems, locations and storage media serving to retain data, whether on a temporary or permanent basis, and to provide such retained data. The terms "storage" and "data storage" as used herein include, but are not limited to, hard disks, solid state drives, flash memory, DRAM, RAM, ROM, tape cartridges and any other medium capable of storing computer readable data.

Figure 1:
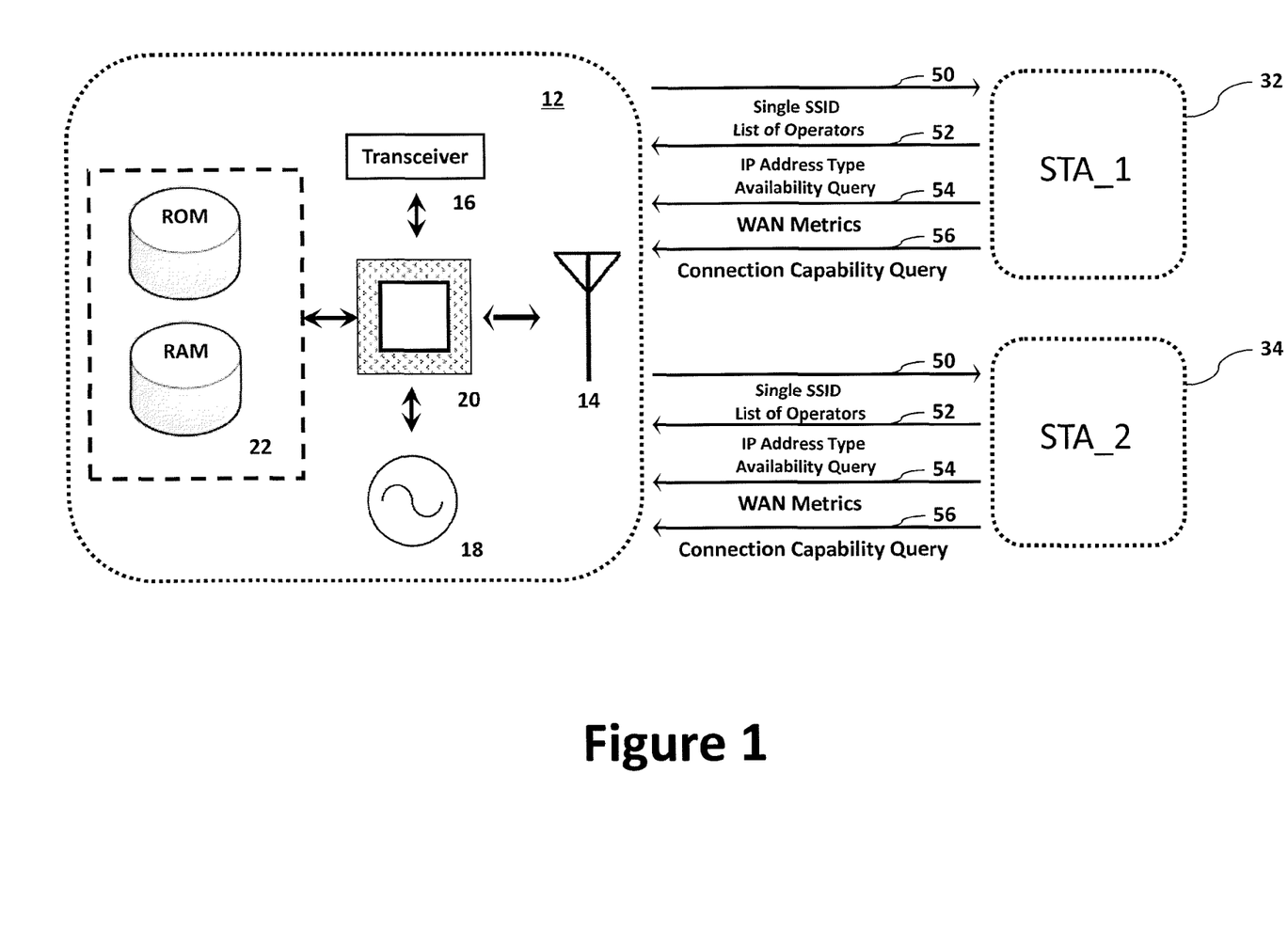
FIG. 1 is a schematic block diagram of the hardware according to the preferred embodiment.

FIG. 1 is a block diagram of the hardware according to the preferred embodiment. Access Point ("AP") 12 includes typical circuitry such as antenna(s) 14, a transceiver 16, a power module 18, a CPU 20 (e.g., one or more processors), and a memory 22 (including ROM and RAM). Each station STA_1 32 and STA_2 34 includes similar circuitry, not shown in FIG. 1 for clarity. Each memory 22 is loaded with computer program code designed to cause the one or more processors to perform certain functions as described below. Of course, any type of controller or processor may be used in addition to, or as a replacement of, the CPU 20. For example, Application Specific Integrated Circuits ("ASICs"), Digital Signal Processors ("DSPs"), gate arrays, analog circuits, dedicated digital and/or analog processors, hard-wired circuits, etc., may be used to perform the control functions described herein. Instructions for controlling the one or more of such processors may be stored in any desirable memory such as computer-readable media and/or non-transitory data structure, floppy diskettes, hard drives, CD-ROMs, DVDs, RAMs, Flash RAMs storage, EEPROMs, magnetic media, optical media, magneto-optical media, or network connected storage, etc.

Generally speaking, an STA can query an AP identified by a single SSID with a new message about the IP Address Type Availability of each Network Operator. The AP in turn returns a response with the IP Address Type Availability for that Network Operator. An AP broadcasts beacons which contain a SSID field indentifying a service set including this AP. An STA can send a query message asking about WAN Metrics or Connection Capability for each of the Network accessible through the AP. The AP will then send a response back with the information responsive to the STA query. More specifically, in FIG. 1, when the AP 12 broadcasts the single SSID 50 to STA_1 32, a means is desired to indicate to the STA the capabilities supported by each operator network, prior to association. In operation, an AP periodically broadcasts beacons containing various information, the information including a single SSID. An STA can listen to the broadcasts and obtain information from the broadcasts. An STA can further query for info from an AP. The information added by this invention include the said thee, which are in addition to the standard ANQP protocol.

Preferably, an AP query protocol is used to provide the required information to the STA. Three examples of capabilities that can be indicated, on a per-operator basis, in the AP query protocol include: (i) IP Address Type Availability Query 52; (ii) WAN Metrics Query 54; and (iii) Connection Capability Query 56.

IP Address Type Availability Query.

The Internet Protocol ("IP") Address Type Availability Query 52 is preferably used by a requesting STA to determine the IP address version and type that could be allocated for a specific network after a successful association of the STA to that specific network. In the Wi-Fi context, an STA associates to an AP. The AP may provide connections to multiple operator networks. An STA may want to connect to a specific operator network after association with an AP. An STA is not called to be associated with the corresponding operator network, even though it is true from a generic sense. This query allows for multiple networks reachable through a single SSID to have different IP address type availability characteristics. For example, one network path passes through a network address translation (NAT) router while the other does not pass through a NAT router, both reachable through the same SSID.

In response to an IP Address Type Availability Query, a responding AP 12 returns an IP Address Type Availability Information element as specified in section 7.3.4.8 of Amendment 9 (see Tables 1 and 2 below). This returned IP Address Type Availability Information element is specific to the network specified in the IP Address Type Availability Query.

TABLE 1

IPv6 Address Field Values

| Address value | Meaning |
| --- | --- |
| 0 | Address type not available |
| 1 | Address type available |
| 2 | Availability of the address type not known |
| 3 | Reserved |

TABLE 2

IPv4 Address Field Values

| Address value | Meaning |
| --- | --- |
| 0 | Address type not available |
| 1 | Public IPv4 address available |
| 2 | Port-restricted IPv4 address available |
| 3 | Single NATed private IPv4 address available |
| 4 | Double NATed private IPv4 address available |
| 5 | Port-restricted IPv4 address and single NATed IPv4 address available |
| 6 | Port-restricted IPv4 address and double NATed IPv4 address available |
| 7 | Availability of the address type is not known |
| 8-63 | Reserved |

A network is specified either (i) by using the Network Access Identifier ("NAI") Realm Name Data (for Extensible Authentication Protocol ("EAP") authenticated networks) as specified in section 7.3.4.9 of Amendment 9, or (ii) by referring to the index of the network associated with a particular Authentication Type (for Redirect authenticated networks) as specified in section 7.3.4.5 of Amendment 9 (see Tables 3 and 4 below).

TABLE 3

Authentication Parameter types

| Authentication Information | ID | Description | Length (Octets) |
| --- | --- | --- | --- |
| Reserved | 0 | | |
| Expanded EAP Method | 1 | Expanded EAP Method Subfield | 7 |
| Non-EAP Inner Authentication Type | 2 | Enum (0—Reserved, 1—PAP, 2—CHAP, 3—MSCHAP, 4—MSCHAPV2) | 1 |
| Inner Authentication EAP Method Type | 3 | Value drawn from IANA EAP Method Type Numbers | 1 |
| Expanded Inner EAP Method | 4 | Expanded EAP Method Subfield | 7 |
| Credential Type | 5 | Enum (1—SIM, 2—USIM, 3—NFC Secure Element, 4—Hardware Token, 5—Softoken, 6—Certificate, 7—username/password, 8—none*, 9—Reserved, 10—Vendor Specific) *none means server-side authentication only | 1 |
| Tunneled EAP Method Credential Type | 6 | Enum (1—SIM, 2—USIM, 3—NFC Secure Element, 4—Hardware Token, 5—Softoken, 6—Certificate, 7—username/password, 8—Reserved, 9—Anonymous, 10—Vendor Specific) | 1 |
| Reserved | 7-220 | | |
| Vendor Specific | 221 | Variable | Variable |
| Reserved | 222-255 | | |

TABLE 4

Network Authentication Type Indicator definitions

| Address value | Meaning |
| --- | --- |
| 0 | Acceptance of terms and conditions |
| 1 | On-line enrollment supported |
| 2 | http/https redirection |
| 3 | DNS redirection |
| 4-255 | Reserved |

Figure 2:
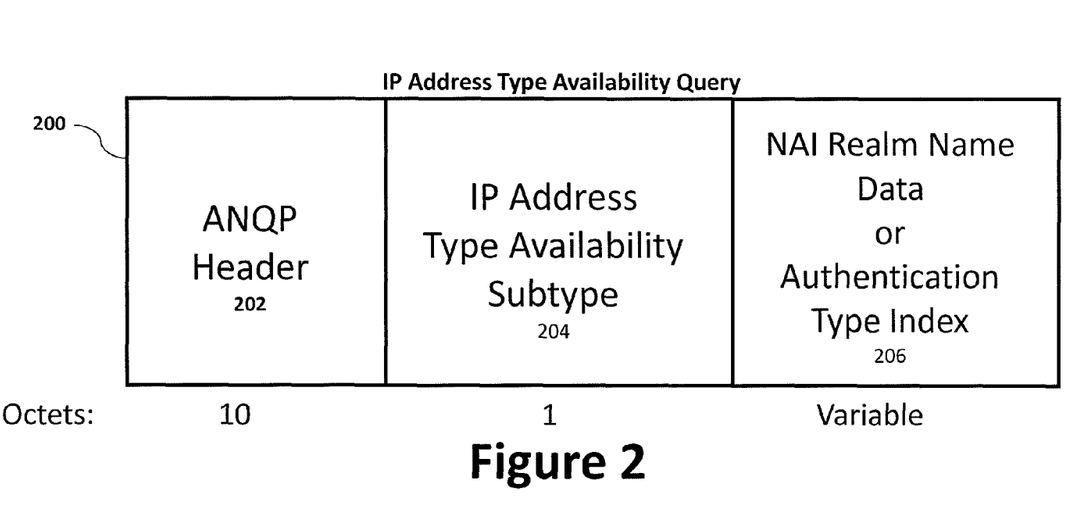
FIG. 2 shows the format of the IP Address Type Availability Query request according to the preferred embodiment.

The format of the IP Address Type Availability Query request is depicted in FIG. 2. IP Address Type Availability Query string 200 generally comprises three segments, a 10 octet ANQP Header 202; a single octet IP Address Type Availability Subtype 204 and a NAI Realm Name Data or Authentication Type Index 206, which may be variable in length.

WAN Metrics Query.

The wide area network ("WAN") Metrics Query 54 is used by a requesting STA to determine the WAN Metrics for a specific network, after a successful association of the STA to that specific network. This query allows for multiple networks reachable through a single SSID to have different WAN Metrics characteristics in real-time. For example, the WAN link for one network is down while the WAN link for another network is up, both reachable through the same SSID.

In response to a WAN Metrics Query, a responding AP returns a WAN Metrics Information element, providing information about transmission characteristics, such as the speed of the WAN connection to the Internet. This returned WAN Metrics Information element is specific to the network specified in the WAN Metrics Query.

Figure 3:
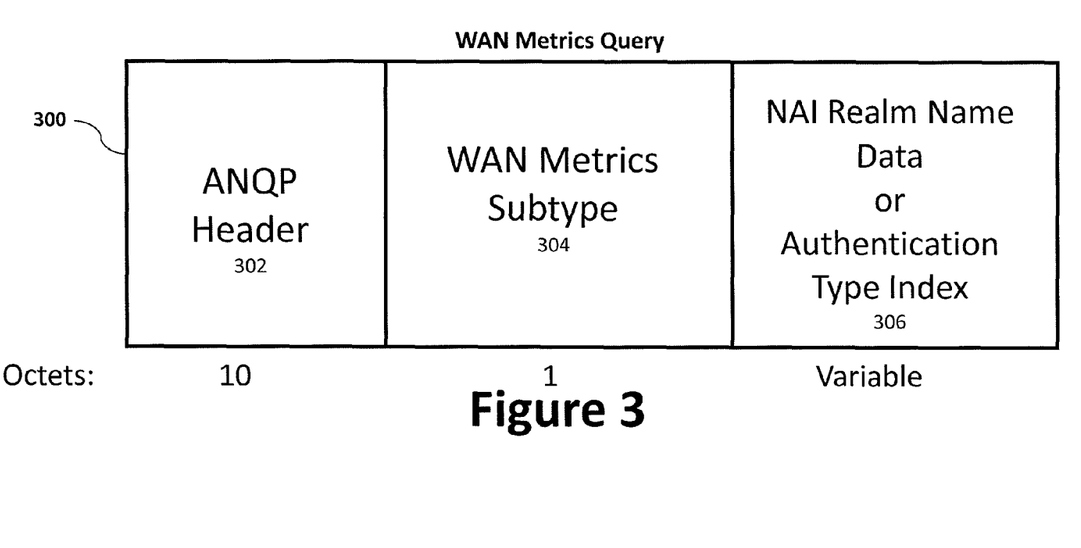
FIG. 3 shows the format of the WAN Metrics Query request according to the preferred embodiment.

The format of the WAN Metrics Query request is depicted in FIG. 3. The WAN Metrics Query string 300 is generally comprised of three segments: a 10 octet ANQP Header 302; a single octet WAN Metrics Subtype 304; and a NAI Realm Name Data or Authentication Type Index 306, which may be variable in length.

A network is specified either (i) by using the NAI Realm Name Data (for EAP authenticated networks) as specified in section 7.3.4.9 of Amendment 9; or (ii) by referring to the index of the network associated with a particular Authentication Type (for Re-direct authenticated networks) as specified in section 7.3.4.5 of Amendment 9. (See Tables 3 and 4, above.)

Connection Capability Query.

The Connection Capability Query 56 is preferably used by a requesting STA to determine the Connection Capability for a specific network, after a successful association of the STA to that specific network. This query allows for multiple networks reachable through a single SSID to have different Connection Capability characteristics. For example, the WAN path for one network may have different firewall filter settings from the WAN path for another network, however, both are reachable through the same SSID. Such firewall setting differentiation could be at the AP end or at the far ends of the WAN paths.

In response to a Connection Capability Query, a responding AP returns a Connection Capability Information element, providing information on the connection status within the hotspot of the most commonly used communications protocols and ports. This returned Connection Capability Information element is specific to the network specified in the Connection Capability Query.

A network is specified either (i) by using the NAI Realm Name Data (for EAP authenticated networks) as specified in section 7.3.4.9 of Amendment 9; or (ii) by referring to the index of the network associated with a particular Authentication Type (for Re-direct authenticated networks) as specified in section 7.3.4.5 of Amendment 9. (See Tables 3 and 4, above.)

Figure 4:
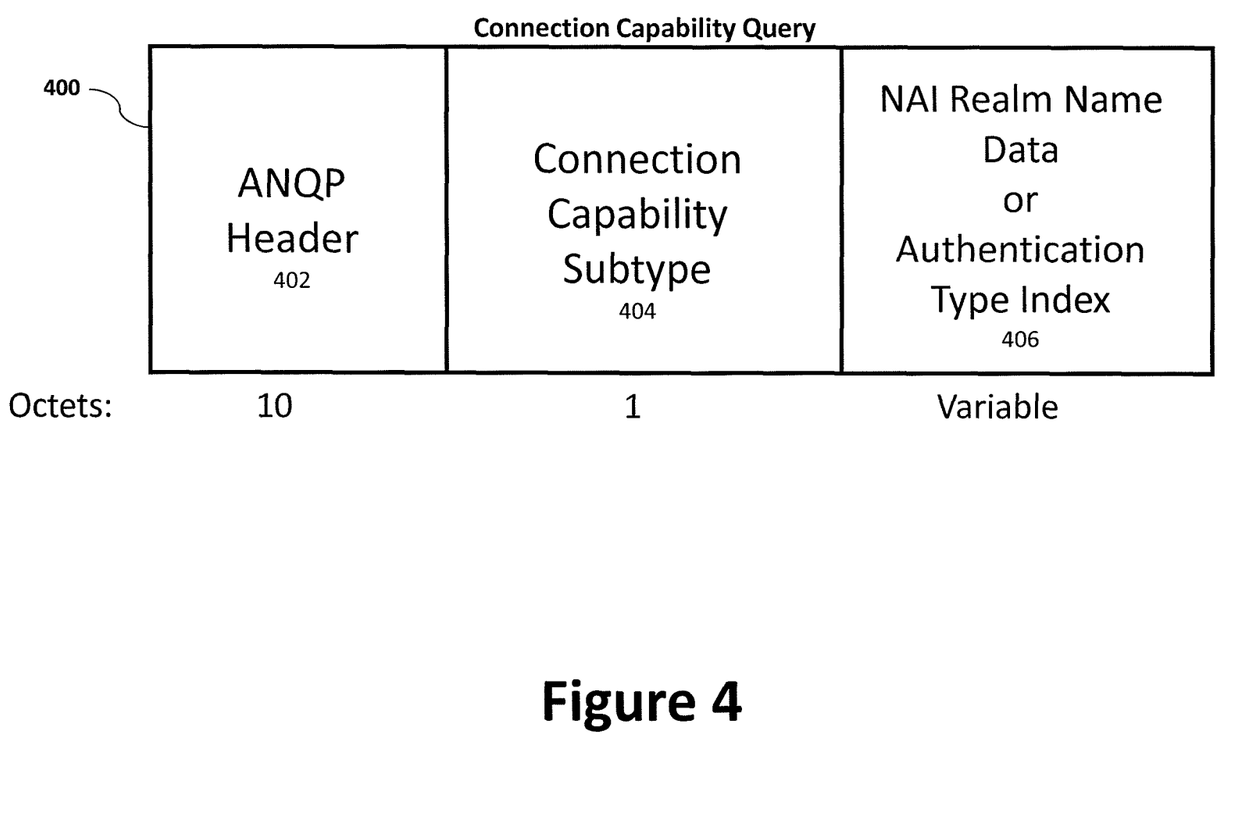
FIG. 4 shows the format of the Connection Capability Query request according to the preferred embodiment.

The format of the Connection Capability Query request is depicted in FIG. 4. The Connection Capability Query string 400 is generally comprised of three segments: a 10 octet ANQP Header 402; a single octet Connection Capability Subtype 404 and a NAI Realm Name Data; or Authentication Type Index 306, which may be variable in length.

Other such capability queries can be implemented. For instance, other operator network characteristics can be queried the same or similar way. While only three network characteristics are described, it would readily apparent to those skilled in the art to monitor and query other network characteristics using the novel methods disclosed herein.

An STA may initiate a query regarding the bandwidth utilization of the AP. Specifically, the STA may request data pertaining to the current amount of bandwidth used, amount remaining and the number of connected users. An STA may initiate a query regarding the channel/radio availability of the AP. Such data could include the number of radios in a given AP, the operational frequency band and operational channels. Other AP performance parameters may include, for example, noise floor level, interference level and channel occupancy.

Figure 5:
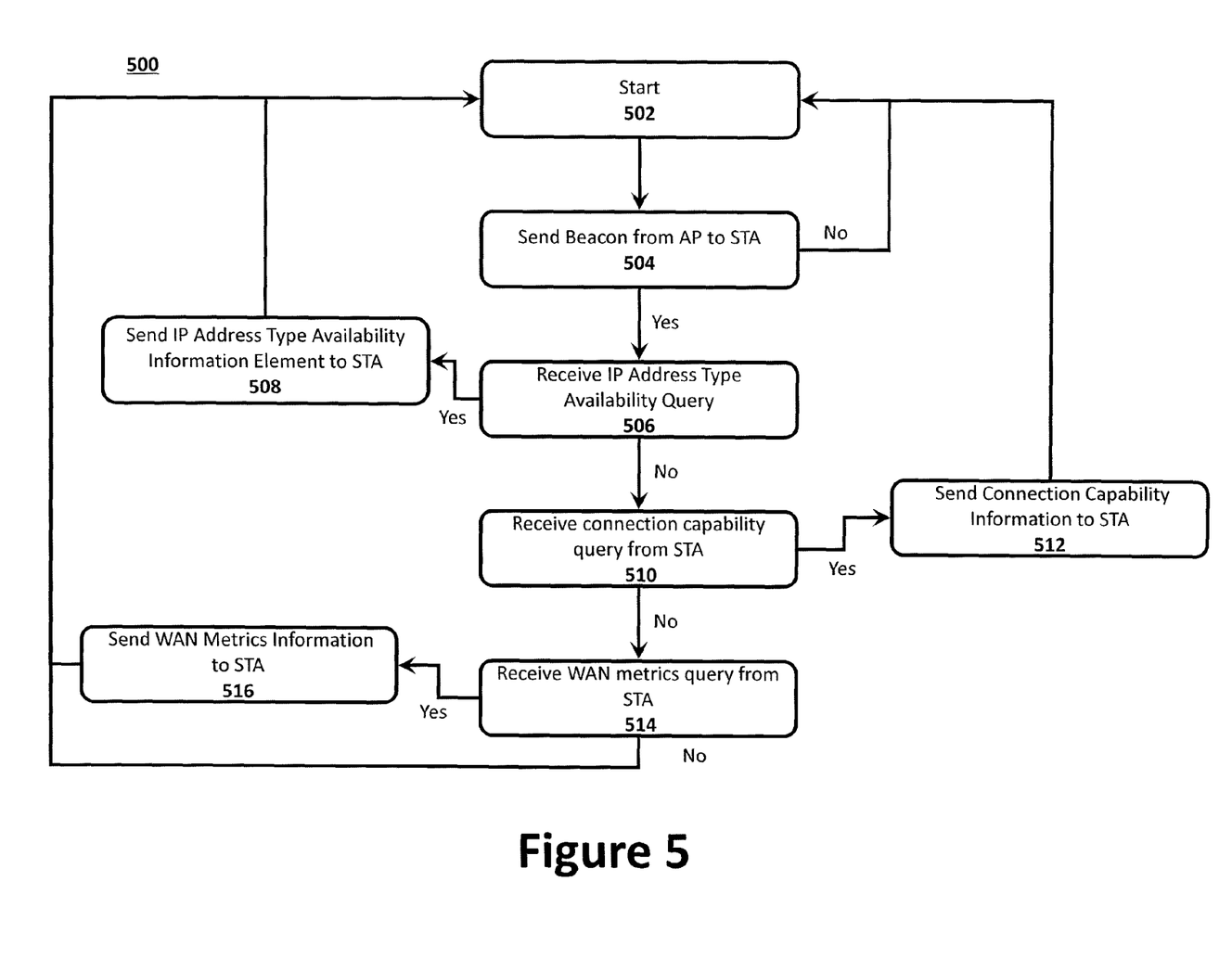
FIG. 5 is a top-level flow diagram of the query-response protocol carried out by the AP according to the preferred embodiment.

FIG. 5 is a top-level flow diagram of the query-response protocol carried out by the AP according to the preferred embodiment. At the AP, the query-response protocol 500 may send a single service set identification ANQP response to a receiving station ("STA") at step 504. As noted above, an AP does not necessarily send SSID information directly to an STA, instead, the APs can periodically broadcast beacons with a single SSID value. An STA may then choose to listen to the beacons to identify information contained within the beacon including the SSID. The ANQP message may include information corresponding to one or more network operators. At step 506, the AP can receive from the STA, for each of the plural network operators, an Internet Protocol ("IP") Address Type Availability Query. In response to the IP Address Type Availability Query, the AP may send to the STA, a response containing an IP address type availability information element at step 508. In response to the ANQP message, the AP may determine whether it has received from the STA, for each of the plural network operators, a wide area ("WAN") metrics query at step 510. In response to the WAN Metrics Query, the AP may send to the STA, for each of the plural network operators, a WAN metrics information element at step 512. In response to the ANQP message, the AP may receive from the STA, for each of the plural network operators, a Connection Capability Query at step 514. In response to the Connection Capability Query, the AP may send to the STA, for each of the plural network operators, a connection capability information element at step 516. If the AP does not receive a query at steps 506, 508 and/or 510, the protocol may repeat the process by returning to the start position 502.

Figure 6:
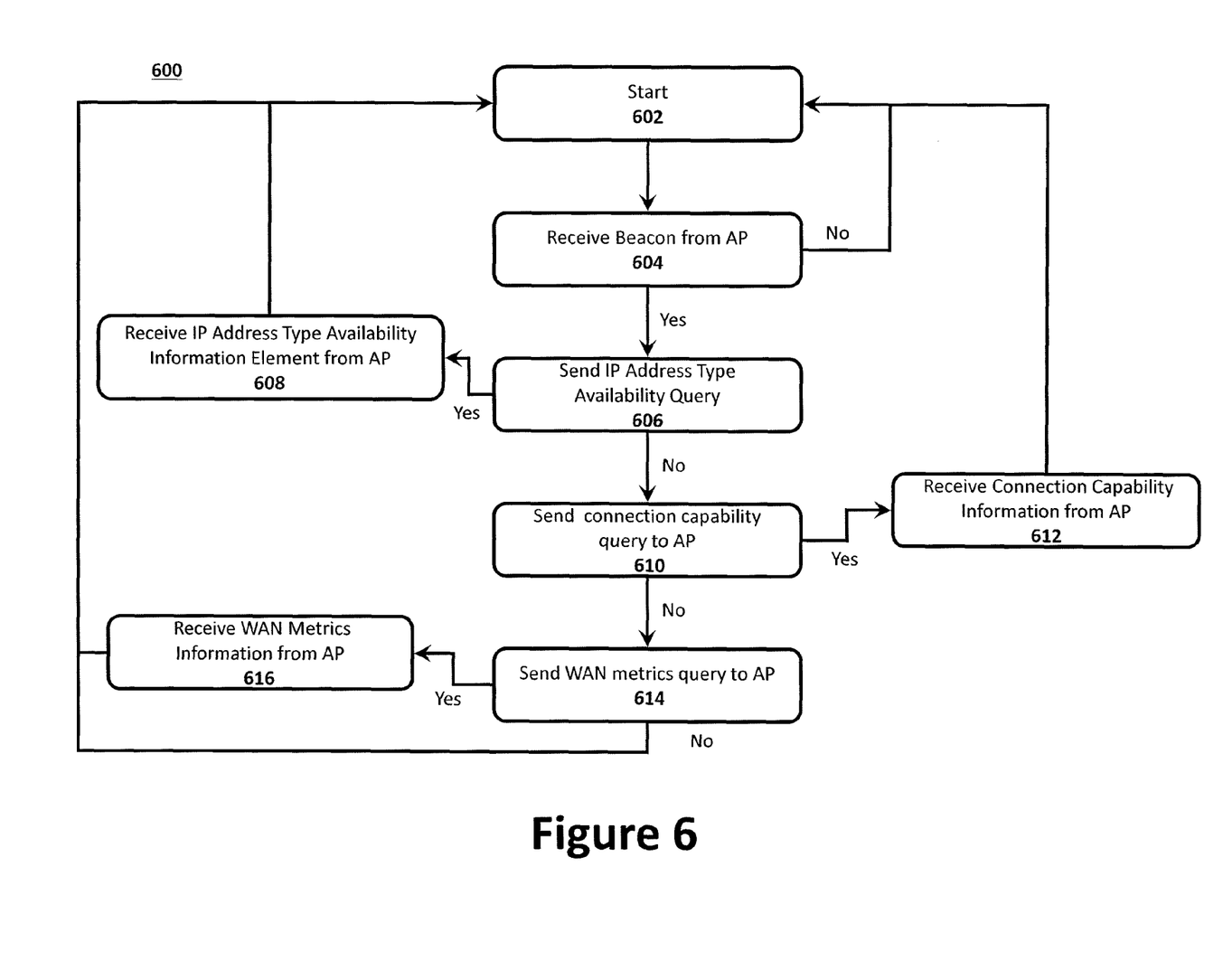
FIG. 6 is a top-level flow diagram of the query-response protocol carried out by the STA according to the preferred embodiment.

FIG. 6 is a top-level flow diagram of the query-response protocol carried out by the STA according to the preferred embodiment. At the STA, the query-response protocol 600 may receive a single service set ANQP response from an AP at step 604. The ANQP message may include information corresponding to one or more network operators. At step 606, the STA can send to the AP, for each of the plural network operators, an Internet Protocol ("IP") Address Type Availability Query, in response to the single SSID. In response to the IP Address Type Availability Query, the STA may receive from the AP, a response containing an IP address type availability information element at step 608. In response to the single SSID, the STA may determine whether it has sent to the AP, for each of the plural network operators, a wide area ("WAN") metrics query at step 610. In response to the WAN Metrics Query, the STA may receive from the AP, for each of the plural network operators, a WAN metrics information element at step 612. In response to the single SSID, the STA may send to the AP, for each of the plural network operators, a Connection Capability Query at step 614. In response to the Connection Capability Query, the STA may receive from the AP, for each of the plural network operators, a connection capability information element at step 616. If the STA does not send a query at steps 606, 608 and/or 610, the protocol may repeat the process by returning to the start position 602.

The above-cited publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those with skill in the art. Thus, it is to be understood that the invention may therefore be practiced otherwise than as specifically described above.

What is claimed is:

1. An Access Point (AP) apparatus comprising one or more processors containing instructions configured to cause the AP to:

broadcast a single Service Set Identification (SSID) identifying the AP;

send to a user device station (STA) a list of a plurality of operator networks accessible through the AP identified by the single SSID;

receive from the STA), a capability query for each of at least one of the plurality of operator networks accessible through the AP identified by the single SSID; and send to the STA, a capability response for each of the at least one of the plurality of operator networks accessible through the AP identified by the single SSID, before the STA is associated with the AP.

2. The AP apparatus of claim 1, wherein the capability query is for querying a network characteristic of each of the at least one of the plurality of operator networks accessible through the AP identified by the single SSID.

3. The AP apparatus of claim 1, wherein the capability query is an Internet Protocol (IP) Address Type Availability query and the capability response comprises an IP Address Type Availability information element.

4. The AP apparatus of claim 1, wherein the capability query is a Wide Area Network (WAN) Metrics query and the capability response comprises a WAN Metrics information element.

5. The AP apparatus claim 1, wherein the capability query is a Connection Capability Query and the capability response comprises a Connection Capability information element.

6. The AP apparatus of claim 1, wherein the one or more processors contains program code configured to receive the capability query and send the capability response using an Access Network Query Protocol (ANQP).

7. The AP apparatus of claim 1, wherein at least one of the capability query and the capability response comprises an operator network identifier identifying a particular operator network of the plurality of operator networks.

8. The AP apparatus of claim 1, wherein the AP comprises a Wi-Fi AP.

9. A method for an Access Point (AP) for indicating network capabilities, the method comprising:

broadcasting a single Service Set Identification (SSID) identifying the AP;

sending to a user device station (STA) a list of a plurality of operator networks accessible through the AP identified by the single SSID;

receiving from the STA, a capability query for each of at least one of the plurality of operator networks accessible through the AP identified by the single SSID; and sending to the STA, a capability response for each of the at least one of the plurality of operator networks accessible through the AP identified by the single SSID, before the STA is associated with the AP.

10. The method of claim 9, wherein the capability query is for querying a network characteristic of each of the at least one of the plurality of operator networks accessible through the AP identified by the single SSID.

11. The method of claim 9, wherein the capability query is an Internet Protocol (IP) Address Type Availability query and the capability response comprises an IP Address Type Availability information element.

12. The method of claim 9, wherein the capability query is a Wide Area Network (WAN) Metrics query and the capability response comprises a WAN Metrics information element.

13. The method of claim 9, wherein the capability query is a Connection Capability Query and the capability response comprises a Connection Capability information element.

14. The method of claim 9, wherein receiving the capability query and sending the capability response uses an Access Network Query Protocol (ANQP).

15. The method of claim 9, wherein at least one of the capability query and the capability response comprises an operator network identifier identifying a particular operator network of the plurality of operator networks.

16. The method of claim 9, wherein the AP comprises a Wi-Fi AP.

17. A mobile station (STA) comprising one or more processors containing instructions configured to cause the STA to:

receive from an Access Point (AP) a single Service Set Identification (SSID) identifying the AP;

receive from the AP a list of a plurality of operator networks accessible through the AP identified by the single SSID;

send to the AP a capability query for each of at least one of the plurality of operator networks accessible through the AP identified by the single SSID; and receive from the AP, a capability response for each of the at least one of the plurality of operator networks accessible through the AP identified by the single SSID, before the STA is associated with the AP.

18. The STA apparatus of claim 17, wherein the capability query is for querying a network characteristic of each of the at least one of the plurality of operator networks accessible through the AP identified by the single SSID.

19. The STA apparatus of claim 17, wherein the capability query is an Internet Protocol (IP) Address Type Availability query and the capability response comprises an IP Address Type Availability information element.

20. The STA apparatus of claim 17, wherein the capability query is a Wide Area Network (WAN) Metrics query and the capability response comprises a WAN Metrics information element.

21. The STA apparatus claim 17, wherein the capability query is a Connection Capability Query and the capability response comprises a Connection Capability information element.

22. The STA apparatus of claim 17, wherein the one or more processors contains program code configured to send the capability query and receive the capability response using an Access Network Query Protocol (ANQP).

23. The STA apparatus of claim 17, wherein at least one of the capability query and the capability response comprises an operator network identifier identifying a particular operator network of the plurality of operator networks.

24. The STA apparatus of claim 17, wherein the AP comprises a Wi-Fi AP.

25. A method for a mobile station (STA) for requesting network capabilities, the method comprising:

receiving from an Access Point (AP) a single Service Set Identification (SSID) identifying the AP;

receiving from the AP a list of a plurality of operator networks accessible through the AP identified by the single SSID;

sending to the AP a capability query for each of at least one of the plurality of operator networks accessible through the AP identified by the single SSID; and receiving from the AP, a capability response for each of the at least one of the plurality of operator networks accessible through the AP identified by the single SSID, before the STA is associated with the AP.

26. The method of claim 25, wherein the capability query is for querying a network characteristic of each of the at least one of the plurality of operator networks accessible through the AP identified by the single SSID.

27. The method of claim 25, wherein the capability query is an Internet Protocol (IP) Address Type Availability query and the capability response comprises an IP Address Type Availability information element.

28. The method of claim 25, wherein the capability query is a Wide Area Network (WAN) Metrics query and the capability response comprises a WAN Metrics information element.

29. The method of claim 25, wherein the capability query is a Connection Capability Query and the capability response comprises a Connection Capability information element.

30. The method of claim 25, wherein the one or more processors contains program code configured to send the capability query and receive the capability response using an Access Network Query Protocol (ANQP).

31. The method of claim 25, wherein at least one of the capability query and the capability response comprises an operator network identifier identifying a particular operator network of the plurality of operator networks.

32. The method of claim 25, wherein the AP comprises a Wi-Fi AP.

* * * * *

UNITED STATES PATENT AND TRADEMARK OFFICE
CERTIFICATE OF CORRECTION

PATENT NO. : 9,462,460 B2  
APPLICATION NO. : 14/552962  
DATED : October 4, 2016  
INVENTOR(S) : Huang et al.

Page 1 of 1

It is certified that error appears in the above-identified patent and that said Letters Patent is hereby corrected as shown below:

On the Title Page

Item (57), Line 4, delete "indentifying" and insert -- identifying --, therefor.

In the Specification

Column 2, Lines 4-5, delete "indentifying" and insert -- identifying --, therefor.

Column 2, Line 15, delete "indentifying" and insert -- identifying --, therefor.

Column 2, Line 27, delete "indentifying" and insert -- identifying --, therefor.

Column 2, Line 37, delete "indentifying" and insert -- identifying --, therefor.

Column 4, Line 32, delete "indentifying" and insert -- identifying --, therefor.

In the Claims

Column 9, Line 26, Claim 5, delete "apparatus claim" and insert -- apparatus of claim --, therefor.

Column 10, Line 42, Claim 21, delete "apparatus claim" and insert -- apparatus of claim --, therefor.

Signed and Sealed this  
Thirty-first Day of January, 2017

Michelle K. Lee  
*Director of the United States Patent and Trademark Office*